Nov. 17, 1936.　　　　V. LOBASSO　　　　2,061,082
FLUID OPERATED MOTOR FOR SANDPAPERING MACHINES OR THE LIKE
Original Filed June 25, 1932　　3 Sheets-Sheet 1
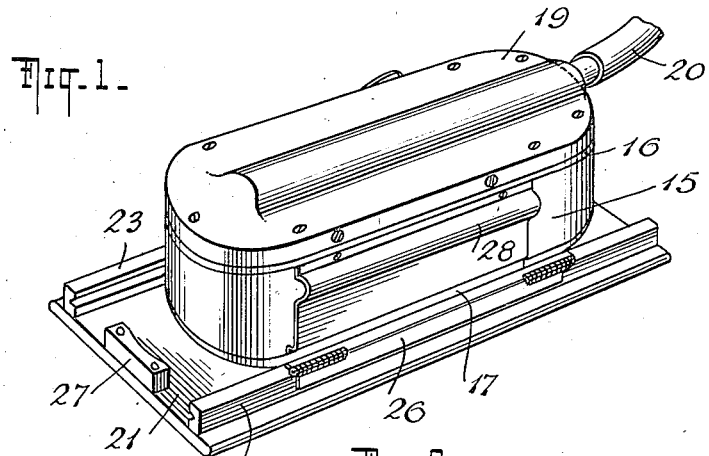
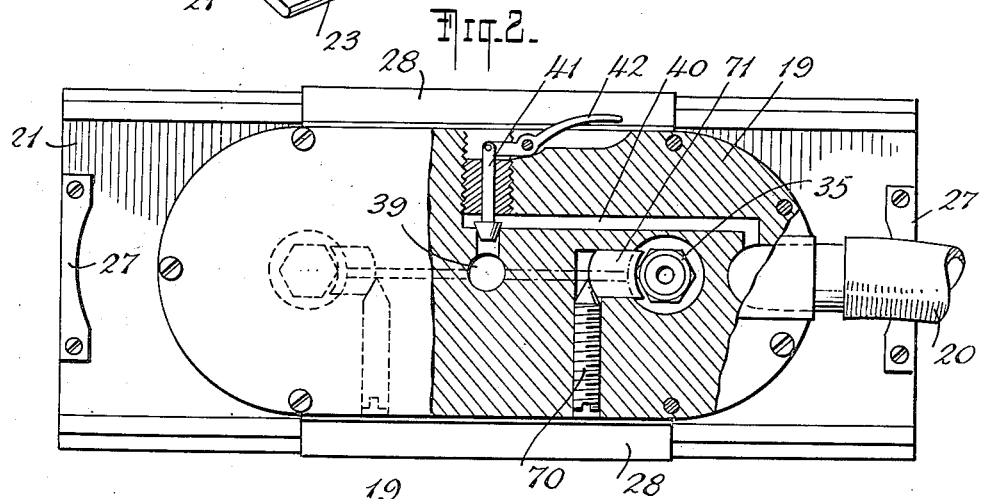
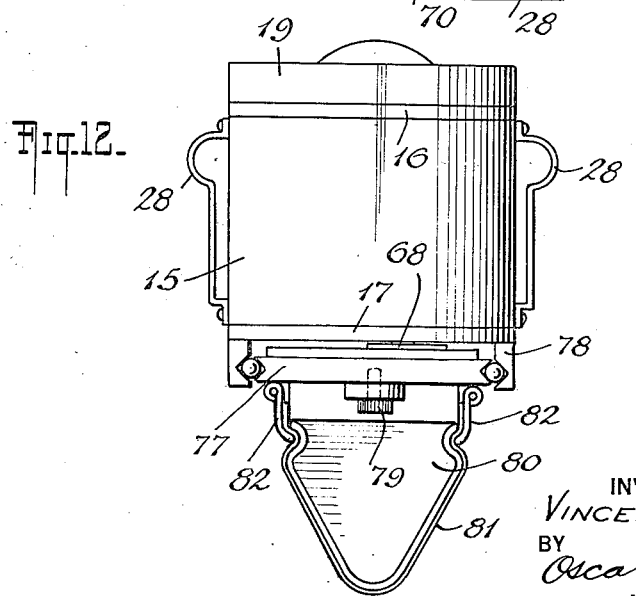
INVENTOR
VINCENT LOBASSO
BY
Oscar A. Geier
ATTORNEY

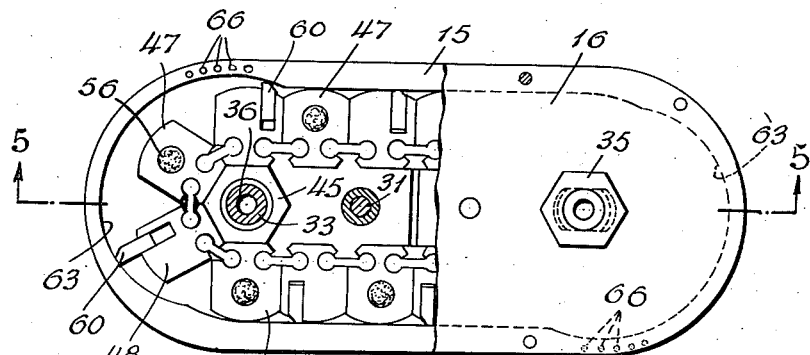
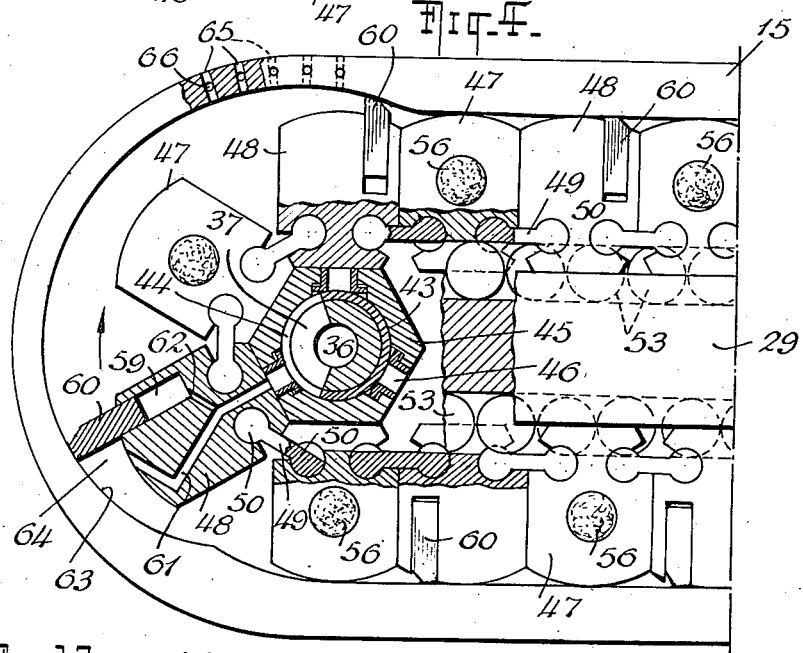
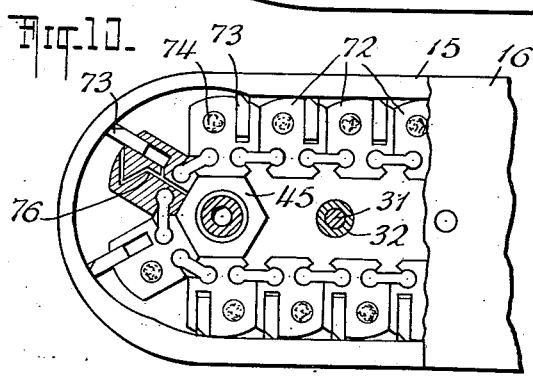
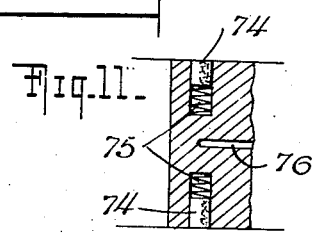

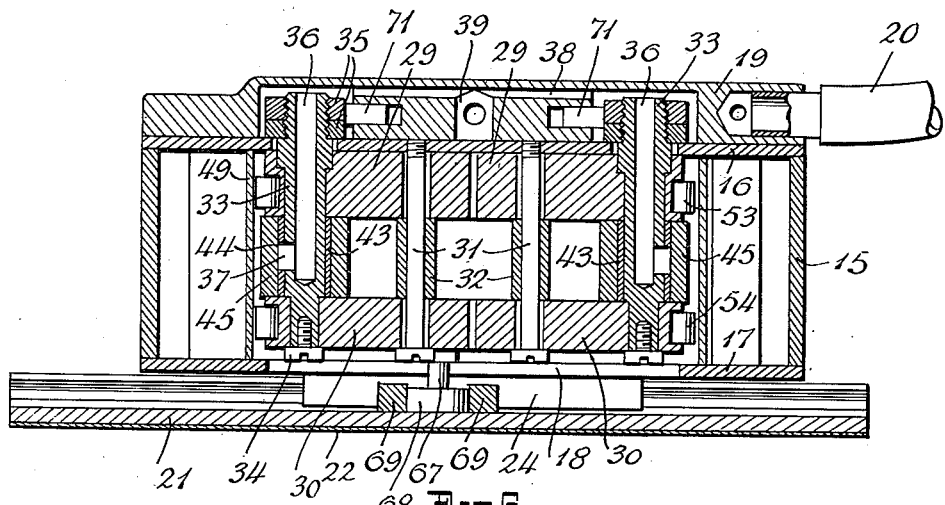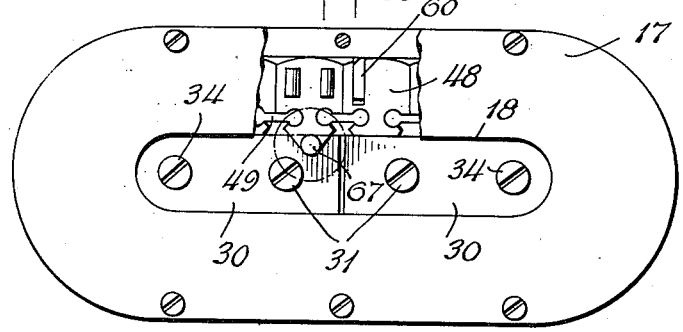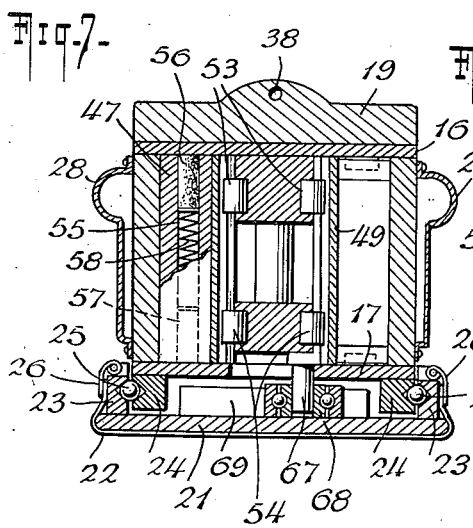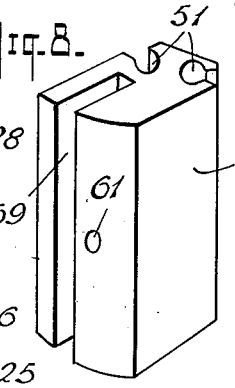

Patented Nov. 17, 1936

2,061,082

UNITED STATES PATENT OFFICE 2,061,082

FLUID OPERATED MOTOR FOR SANDPAPERING MACHINES OR THE LIKE

Vincent Lobasso, New York, N. Y.

Refiled for abandoned application Serial No. 619,270, June 25, 1932. This application June 29, 1936, Serial No. 87,999

10 Claims. (Cl. 121—3)

This application is a refiling of abandoned application Ser. No. 619,270 dated June 25, 1932.

This invention relates to improvements in fluid actuated motors and has particular reference to a type of motor suitable for operating sandpapering machines or the like.

The general object of the invention is to provide an improved motor of simple, compact and practical construction, which, under the influence of fluid pressure, will operate at a high speed to drive a movable member for a carriage upon which a piece of sandpaper may be mounted.

The above and other objects will appear more clearly from the following detailed description when taken in connection with the accompanying drawings which illustrate preferred embodiments of the inventive idea.

In the drawings:

Figure 1 is a perspective view of an apparatus embodying the present invention, illustrating the same as a hand controlled type of machine.

Figure 2 is a top plan view partly broken away and shown in section.

Figure 3 is a fragmentary plan view partly broken away and with portions of the mechanism shown in section.

Figure 4 is a similar view taken on a different horizontal plane from Figure 3.

Figure 5 is a vertical longitudinal section on the line 5—5 of Figure 3 and illustrating the manifold of the motor in position.

Figure 6 is a bottom plan view, partly broken away, of the motor casing.

Figure 7 is a transverse section through the apparatus.

Figures 8 and 9 are different perspectives of one of the link elements of the endless driving means constituting part of the motor.

Figure 10 is a view similar to Figure 3 showing a slightly different form of the invention.

Figure 11 is a sectional view through one of the link elements illustrated in Figure 10, and Figure 12 is an end elevation of a modified form of the apparatus.

The type of apparatus illustrated in Figures 1 to 9 inclusive is intended for hand control and especially adapted for small work. As shown, the apparatus comprises an elongated casing 15 having its ends rounded. Top and bottom plates 16 and 17 respectively are secured to the vertical wall of the casing and the latter plate is provided with an elongated opening 18. Mounted upon the top plate 16 is a manifold or header 19 to one end of which is suitably connected a flexible hose 20 for supplying, from a suitable source, a fluid under pressure, such as air.

The casing 15 contains a driving means operated, as will appear in the course of the description, by the fluid entering the manifold 19 to actuate a movable member such as the reciprocating carriage 21 suspended below the casing and adapted to carry a sheet of sandpaper 22. The member 21 is provided with side flanges 23 (see Figure 7) extending exteriorly of and opposed to longitudinal guide strips 24 secured to the under side of the bottom plate 17 and between which flanges and strips are interposed the ball bearings 25 employed to reduce to a minimum the friction between the relatively movable parts as the carriage is reciprocated. The flanges 23 also carry spring pressed clamps 26 utilized to grip the edges of the sheet of sandpaper 22 thereby to securely hold the same in position during operation of the motor. To the ends of the carriage 21 bumpers 27 may be secured thereto which may engage the rounded end of the casing 15 as the carriage is reciprocated. To the opposed sides of the vertical wall of the casing 15 hand grips 28 are secured which enable the operator to grip the motor in one hand and thereby assume directional control of the apparatus as it is being operated.

Within the casing 15 there is mounted a supporting and guiding structure for the endless driving means previously referred to and about which said means extend. This structure is preferably in the form of two complemental units which are relatively adjustable longitudinally of the casing for the purpose of controlling the tension of said driving means and taking up any slack therein. The manner in which these units are adjustable will appear in the course of the description. Each of the units comprises upper and lower spaced blocks 29 and 30 respectively disposed between the top and bottom plates 16 and 17 and held in cooperative relation by a screw-bolt 31, the intermediate portion of which is surrounded by a spacing sleeve 32 interposed between the two said blocks, the bolt being threaded into the upper plate 16 and being manipulated through the opening 18 in the bottom plate 17. Adjacent the outer end of the blocks 29 and 30 of each unit and extending therethrough, is a stationary pintle 33 secured in position at its lower end by means of a setscrew 34 and having threaded upon its upper end the locknuts 35 which engage the top plates 16. Said upper end of the pintle extends into the manifold 19 and the pintle is provided with a longitudinal bore 36 for receiving fluid from said manifold. At the lower end of the bore 36 the pintle has a lateral port 37 through which the fluid in the bore escapes to accomplish the function of operating the driving means in a manner to later appear. The entrance of the fluid under pressure into the bores 36 and the two pintles at opposite ends of the supporting structure is accomplished by a longitudinal passage 38 formed in the manifold 19 and communicating at an intermediate point with a small ported chamber 39 which in turn communicates with a duct 40 extending to one end of the manifold where it receives air from the hose 20. The entrance of air into the chamber 39 is controlled by a manually operated valve 41 the handle 42 of which extends exteriorly of the casing 15 and is disposed adjacent one of the hand grips 28 so that the operator may depress said handle with a finger or the thumb when the apparatus is gripped for operation and thereby open said valve 41 to admit the air to the chamber 39 from whence it passes in both directions to the bores 36 in the pintles 33.

Between the blocks 29 and 30 of each unit the associated pintle 33 is surrounded by a bearing sleeve 43 having a port 44 therein which registers with the port 37 in said pintle and rotatable about said sleeve is a hexagonal guide member 45 provided with ports 46 in certain faces thereof which are adapted to be successively brought into alignment or registration with the ports 37 and 44 as the guide member 45 is rotated by the previously mentioned endless driving means. Said means is in the nature of a chain consisting of a plurality of link members 47 and 48 alternately arranged throughout the length of the chain and disposed in juxtaposition to each other, the adjacent link members being operatively joined by means of connecting elements 49 having enlarged spherical edges 50 which engage in grooves 51 formed in the inner faces of said link members. The inner faces of the members 47 and 48 are also provided with upper and lower transverse channels or grooves 52 (Figure 9) in which are engaged the upper and lower series of roller bearings 53 and 54 carried respectively by the upper and lower blocks 29 and 30, said series of rollers extending the lengths of said blocks so as to provide antifriction bearings for the endless elements as the same is driven at a high speed in the manner to presently appear. Each of the link elements 47 is bored vertically throughout its height as indicated at 55 and in the upper and lower ends of said bore are mounted the lubricating wicks 56 and 57 with a spring 58 interposed therebetween to force said wicks upwardly and downwardly into engagement with the plates 16 and 17 respectively. These wicks are saturated with a suitable lubricant and their engagement with the plates 16 and 17 is designed to further reduce friction while the driving means is being operated. Each of the link elements 48 is provided in its outer face with a recess 59 which receives a piston 60 extending the entire height of the element and slidable laterally in said recess, the outward movement of the piston being under the influence of the fluid pressure while the inward movement thereof is controlled by the engagement of its outer edge with the vertical wall of the casing 15. Thus as the endless driving means is moved in the direction of the arrow (Figure 4) and one of the elements 48 approaches one of the rounded ends of the casing 15, said element engages one of the faces of the adjacent guide 45 having a port 46 therein. After this engagement a further sliding advancement of the element 48 brings the same to the position shown in section in Figure 4, at the same time rotating the guide 45, and thereupon causes the port 46 to register with the ports 37 and 44. The fluid under pressure now flows through said port 46 and into a duct 61 in said element, said duct extending from the inner to the outer face thereof. At the same time the compressed fluid enters a branch duct 62 leading to the inner end of the recess 59. The rounded end of the vertical wall of the casing 15 has its inner surface eccentrically curved as indicated at 63 so that when the element 48 reaches the position just described the outer face thereof will be spaced from said wall. The pressure of the fluid against the inner end of the piston 60 will therefore force the latter outwardly and maintain the same in engagement with said curved surface 63 and thereby form a chamber 64 behind the piston. The fluid exhausting through the duct 61 enters said chamber 64 and impinges against the rear face of said piston and thus drives the element 48 in the desired direction. Adjacent the other end of the eccentrically curved surface 63 a vertical wall of the casing 15 is provided with a series of vertical rows of lateral exhaust ports 65 connected by vertical passages 66 which act to muffle the exhaust of the compressed fluid through the port 65 after the element 48 has passed the latter. Approaching the end of the curved surface 63 the piston 60 is forced inwardly until the outer surface of said element 48 again engages a straight portion of the wall of the casing. The operation just described is repeated at the other end of the casing from whence it will be seen that on each cycle of the endless driving means, each of the elements 48 thereof will receive two impulses and that consequently the driving means will be continuously operated.

In order to drive the movable member 21, one of the link elements of the driving means is provided at its lower end with a depending pin 67 (Figures 5 and 7) extending through the slot 18 in the bottom plate 17 and carrying at its lower end a ball bearing member 68. The member 68 is interposed between two strips 69 carried by the carriage 21 and extending transversely thereof and, by reason of its contact with said strips, it will be apparent that the movement of the endless driving means throughout one cycle thereof will cause the carriage 21 to be reciprocated. As the link element of the driving means which carries the pin 67 makes the turns at opposite ends of the casing the bearing member 68 will move transversely of the carriage 21 and between the strips 69.

Should it be found that there is an undue slackness in the endless driving means which needs to be taken up in order to secure maximum efficiency, the units of the supporting structure previously referred to and which include the blocks 29 and 30, may be adjusted away from each other and longitudinally of the casing by means, best shown in Figure 2, which comprises a setscrew 70 for each unit mounted in the manifold 19 and having its tapered inner end engaged with a slide 71 which in turn contacts the adjacent locknuts 35. An inward adjustment of the screw 70 forces the slide 71 toward one end of the casing and consequently causes the unit with which it is associated to move in a similar direction and thereby secure proper tensioning of the driving means.

In the form of the invention shown in Figures 10 and 11 each of the link elements 72 comprising the endless driving means is provided with a piston 73 similar to the piston 60 and is further provided with upper and lower lubricating wicks 74, each of which is controlled by an individual spring 75 instead of by a common spring such as described in connection with the first embodiment. This is done for the purpose of providing space for the duct 76 in each of the elements through which the fluid under pressure is fed to the inner edge and rear face of the piston 73.

In Figure 12 a slightly different form of mounting for the carriage 77, which corresponds to the carriage 21, is provided. In this instance, said carriage is mounted for reciprocation between the strips 78 depending from the plate 17 and is adapted to have attached to its under surface, by means of a setscrew 79, a block 80 of tapered formation to which a sheet of sandpaper 81 may be attached by means of clamps 82, the formation of said block being such as to permit of access being gained to surfaces to be sandpapered which could not otherwise be reached with the flat construction shown in the embodiment originally described.

What is claimed is:

1. In a fluid operated motor for sandpapering machines, a casing, a movable carriage associated with said casing, a driving arrangement for said carriage within said casing and including a plurality of links having ducts therein, pistons carried by said links, and means to supply fluid pressure to said ducts to move said pistons to operative positions and to propel the same.

2. In a fluid operated motor for sandpapering machines, a casing, a movable carriage associated with said casing, driving means for said carriage within said casing and including rotatable guide members, an endless element extending around said rotatable members and including a plurality of links, pistons carried thereby, and conduits for supplying fluid pressure through said guide members and links to actuate said pistons to thereby operate said driving means.

3. In a fluid operated motor for sandpapering machines, a casing having a bottom plate provided with an elongated opening, a manifold on top of said casing, a supporting structure within said casing and including separable units adjustable relative to each other, each unit consisting of superposed blocks, means accessible through the opening in said plate for securing together the blocks of each unit, an endless flexible driving means extending around said supporting structure, means disposed within said manifold for adjusting said units relative to each other to vary the tension of said driving means, a reciprocatory carriage supported beneath said bottom plate, a connection between said driving means and carriage extending through the opening in said plate, and means to supply fluid under pressure through said manifold to said driving means to operate the latter.

4. In a fluid operated motor for sandpapering machines, a casing having a bottom plate provided with an elongated opening, an inlet on top of said casing, a supporting structure within said casing and including separable units movable relative to each other, an endless flexible driving means extending around said supporting structure, means disposed within said inlet for adjusting said units relative to each other to vary the tension of said driving means, a reciprocatory carriage supported beneath said bototm plate, a connection between said driving means and carriage extending through the opening in said plate, and means to supply fluid under pressure through said inlet to said driving means to operate the latter.

5. In a fluid operated motor for sandpapering machines, a casing having a bottom plate provided with an elongated opening, a reciprocatory carriage supported beneath said bottom plate, a driving arrangement for said carriage within said casing, and a fluid pressure inlet to supply fluid pressure to said driving arrangement, said driving arrangement including a plurality of links having ducts therein, pistons carried by said links and means to supply fluid pressure to said ducts to move said pistons to operative positions and to propel the same.

6. In a fluid operated motor for sandpapering machines, a casing having a bottom plate provided with an elongated opening, a reciprocatory carriage supported beneath said bottom plate, a driving arrangement for said carriage within said casing, and a fluid pressure inlet to supply fluid pressure to said driving arrangement, said driving arrangement including rotatable guide members, an endless driving means extending around said guide members and including a plurality of links, pistons carried thereby, conduit means for the fluid pressure through said guides and said links to operate the latter and thereby actuate said driving arrangement.

7. In a fluid operated motor for sandpapering machines, a casing, a supporting structure within said casing including pintles each having a port therein, a guide revoluble about each pintle and controlling the opening and closing of the port therein, an endless driving means extending around said guides, pistons carried by said driving means and combining with said casing to form chambers, means to supply fluid under pressure through the ports in said pintles to said chambers to operate said driving means, and a movable member actuated by said driving means.

8. In a fluid operated motor for sandpapering machines, a casing, a supporting structure within said casing including pintles each having a port therein, a guide revoluble about each pintle and controlling the opening and closing of the port therein, an endless driving means extending around said guides, pistons carried by said driving means and combining with said casing to form chambers, a manifold on said casing having communication with said ports, means to supply fluid under pressure to said manifold and from thence through said ports to said chambers to operate said driving means, and a movable member actuated by said driving means.

9. In a fluid operated motor for sandpapering machines, a casing, a supporting structure within said casing including pintles each having a port thereon, a guide revoluble about each pintle and controlling the opening and closing of the ports therein, an endless driving means extending around said guides, pistons carried by said driving means and combining with said casing to form chambers, a manifold on said casing having a main duct and branch passages leading to said ports, a valve controlling said main duct, means to supply fluid under pressure to said duct and from thence past said valve to said chambers through said ports to operate said driving means, and a movable member actuated by said driving means.

10. In a fluid operated motor for sandpapering machines, a casing, a supporting structure within said casing including relatively adjustable units, each unit consisting of superposed supporting blocks, a pintle mounted in said blocks and having a port, a guide rotatable on said pintle and controlling said port, an endless driving means extending around said guide and rotating the same, means to adjust the units of said supporting structure relative to each other, means to supply fluid under pressure through said port to said driving means to operate the latter, and a movable member actuated by said driving means.

VINCENT LOBASSO.